② United States Patent [15] 3,672,614
Guerry [45] June 27, 1972

[54] PLASTIC HOLDDOWN DEVICE FOR LOGIC CHASSIS

[72] Inventor: Franklin D. Guerry, Burlington, N.C.

[73] Assignee: Western Electric Company, Incorporated, New York, N.Y.

[22] Filed: Sept. 17, 1970

[21] Appl. No.: 73,155

[52] U.S. Cl. ..............................248/68, 24/263 C, 174/72 A
[51] Int. Cl. ..............................F16l 3/10
[58] Field of Search..........................248/74 R, 68 R, 68 CB; 24/263 PJ, 263 B; 174/72 A; 317/122

[56] References Cited

UNITED STATES PATENTS

| | | | |
|---|---|---|---|
| 3,258,235 | 6/1966 | Mozley | 248/106 |
| 3,210,032 | 5/1965 | Van Slyke | 174/72 A X |
| 3,211,828 | 10/1965 | Cloud | 174/72 A |

FOREIGN PATENTS OR APPLICATIONS

| | | | |
|---|---|---|---|
| 776,921 | 6/1957 | Great Britain | 248/74 |

*Primary Examiner*—Chancellor E. Harris
*Attorney*—W. M. Kain, J. B. Hoofnagle, Jr. and W. L. Williamson

[57] ABSTRACT

A resilient holddown device is employed to secure loose strip material to an underlying support that has affixed thereto a plurality of upward extending projections bounding the strip material. The device includes a base which has a plurality of openings therethrough. Each opening is aligned with an associated one of the projections on the support. A corresponding plurality of slits individually extend traversely from each opening to the periphery of the base. Each of the openings has a cross-sectional dimension sufficiently small to grip the projections when the base is lowered into engagement with the bounded strip material.

7 Claims, 4 Drawing Figures

PATENTED JUN 27 1972 3,672,614

INVENTOR
F. D. GUERRY
By J. A. Finlayson, Jr.
ATTORNEY

PLASTIC HOLDDOWN DEVICE FOR LOGIC CHASSIS

BACKGROUND OF THE INVENTION

1. Field of the Invention

This invention is drawn to a device for securing loose strip material to an underlying support, and more particularly is concerned with a device for securing loose wires to a circuit board.

2. Problems in the Prior Art

In the manufacture of circuit boards that are employed in logic chassis for complex electronic equipment, such as computers, switching systems, and the like, the wiring between terminals of circuits on the board is so extensive that it is necessary to route a plurality of connecting wires over a common wirepath situated between the terminals secured to the board. Each wire along a wirepath is conventionally connected to its respective terminals, such as by wrapping the wire ends around the terminals. Additional connecting wires are routed along wirepaths between other respective terminals of the board in a similar manner.

In many instances, the end connections of the wires at the terminals are insufficient to adequately secure the intermediate portions of the wires to the board. Additional securing means have to be implemented along the length of each wirepath. To achieve this end, the wirepaths are conventionally arranged so that they conveniently intersect with each other at desired locations along the board. At these wirepath intersections a larger number of individual wires from several wirepaths can be secured utilizing a common securing technique.

One such prior art securing technique involves installing a wirewrap terminal at each of four corners of a wirepath intersection. The respective ends of two short tiedown insulated leads which form a cross pattern are then tied individually to the four wirewrap terminals above the intersecting wirepaths. The tiedown leads are then pressed down on the wirepath intersection to secure the wires at the intersection. Unfortunately, the distances between the four wirewrap terminals are frequently so small that it requires special tools to wrap the ends of the equally small tiedown leads about the terminals, so that the wirewrap operation is time consuming. Furthermore, when performing maintenance on the wirepath system, the tiedown leads have to be removed, and upon completion of the maintenance, new tiedown leads have to be installed.

SUMMARY OF THE INVENTION

The present invention is drawn to an improved device for securing wires along a wirepath intersection while avoiding the aforementioned difficulties of the prior art. Briefly, in one embodiment, the device of the present invention consists of a resilient, flat, rectangular body member (e.g., of plastic) that has an opening through each corner. Each opening is adapted to fit over a corresponding aligned wirewrap terminal that defines a wirepath intersection. Each corner opening is so formed to easily capture and slide over a corresponding wirewrap terminal, yet provide a snug fit when the member is pressed upon an underlying wirewrap intersection. In addition, a raised central portion of the member has a loop formed thereon which has the shape of and functionS as a handle. The handle is used to facilitate the removal of the member from the wirepath intersection and corresponding wirewrap terminals when performing maintenance on the wirepath system. Due to the novel construction of the openings, removal of the member is accomplished in the same easy manner as the insertion of the member. The member may be reinserted in the same manner as it was initially inserted upon completion of the maintenance.

DESCRIPTION OF THE DRAWING

A more complete understanding of the invention and its advantages will appear more fully from the following detailed description taken in conjunction with the appended drawings, wherein.

DETAILED DESCRIPTION

Figure 1:
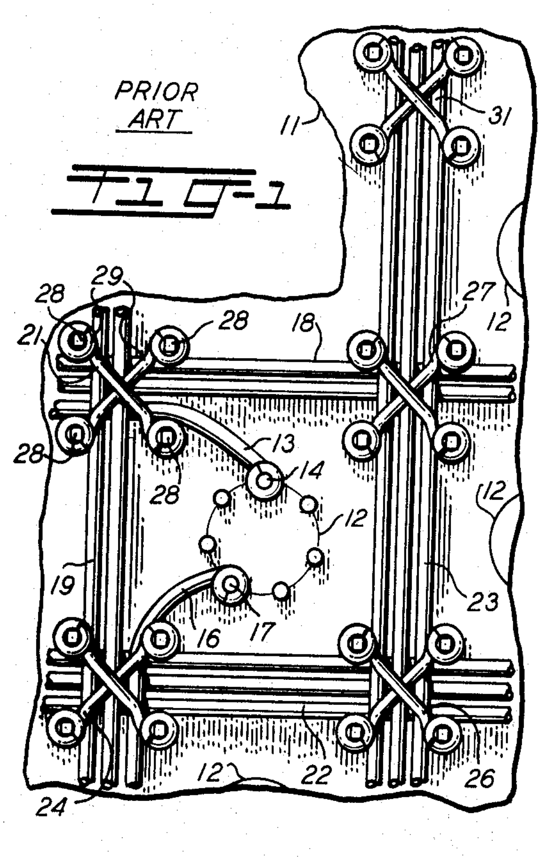
FIG-1 PRIOR ART
FIG. 1 is a plan view of a portion of a circuit board such as that employed in a logic chassis for computers, illustrating a plurality of wirepath intersections and a prior art technique for securing the wires to the board at each wirepath intersection.

Referring more particularly to the drawing, FIG. 1 illustratively shows a circuit board 11 (e.g., such as that employed in a logic chassis of a computer). The board 11 has a plurality of multipin terminal patterns 12 which may be connected to a plurality of leads from a logic circuit extending therethrough in a direction perpendicular to the plane of the drawing. (Only one of the patterns 12 is fully shown.) A first wire 13 having one end wrapped about a first terminal 14 of the pattern 12 forms one of a first plurality of wires extending generally in an X (i.e., horizontal) direction along the board 11. A second wire 16 having one end wrapped about a second terminal 17 of the pattern 12 forms one of a second plurality of wires extending generally in a Y (i.e., vertical) direction along the board 11. The first plurality of wires defines a common wirepath 18, and the second plurality of wires defines a common wirepath 19. The wirepaths 18 and 19 conveniently cross at a junction 21 to define a wirepath intersection. Another pair of perpendicular X–Y wirepaths 22 and 23 cross wirepaths 18 and 19, and each other at designated junctions on the board to define additional wirepath intersections 24, 26 and 27. Such intersections may be conveniently employed as tiedown, or securing points for the wires on the board 11.

Referring specifically to the wirepath intersection 21, there is shown one conventional technique for securing the constituent wirepaths 18 and 19 to the board 11. Located adjacent each corner of the intersection 21 and protruding (e.g., extending outwardly from the plane of the drawing) outwardly from the top of the board 11 are four terminal pins 28—28, illustratively of rectangular cross section.

Two short tiedown leads 29—29, coated with insulative material, are arranged to form a cross pattern between the terminals 28. The respective ends of the wires are secured between diagonally opposite terminals 28 (such as by conventionally wrapping such ends about the associated terminals) so that the tiedown leads 29 are then pressed down by a suitable tool firmly against the underlying wirepaths at the intersection 21 to secure the wires to the board 11. The wires located in wirepath intersections 24, 26 and 27 are secured to the board in a similar manner. In addition, a wirepath location which does not intersect another wirepath, such as a location 31 of wirepath 23, may be secured to the board by the aforementioned technique, if desired.

While the above technique satisfactorily secures the wires in a wirepath to the board 11, its complexities are quite obvious. Specifically, intricate tools have to be employed to wrap the tiedown leads 29 about the terminals 28, and the wrapping itself is time consuming. Further, when it is desired to make changes or repairs to the wirepath system, the tiedown leads 29 must be removed, and new tiedown leads must be installed upon completion of the maintenance. Thus, the tiedown leads 29 are costly to install and maintain.

Figure 2:
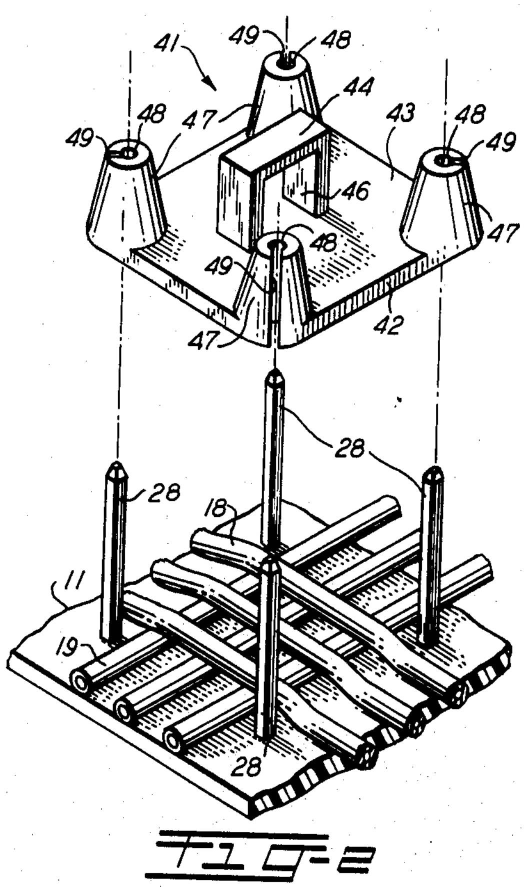
FIG. 2 is an exploded perspective view of a device embodying the present invention, illustrating the manner in which the device is affixed to terminals defining a wirepath intersection of a circuit board.
Figure 4:
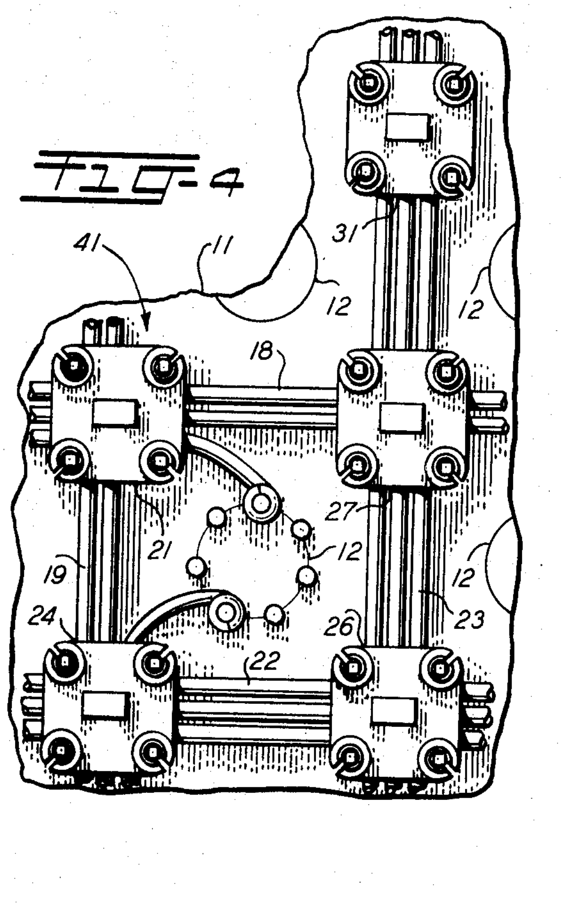
FIG. 4 is a view similar to that of FIG. 1 illustrating a circuit board having a plurality of wirepath intersections in which the wires are secured by the device of the present invention.
Figure 3:
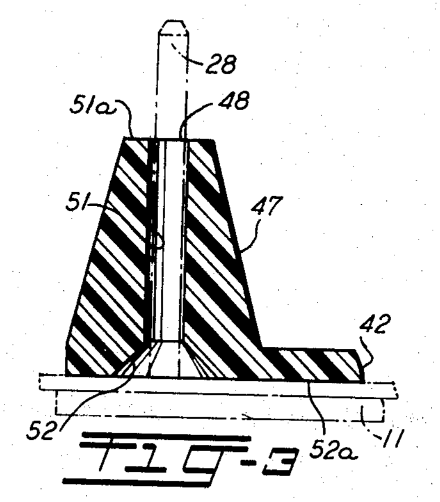
FIG. 3 is a fragmentary side view, in section, illustrating a corner section of the device of FIG. 2, and the manner in which the corner opening of the device captures a corresponding wirepath terminal of the circuit board to fit thereover.

In accordance with the present invention, FIGS. 2–4 illustrate a holddown device 41, which is easily formed, simple to install and can be removed and reinserted repeatedly in a wirepath system for securing wires. Corresponding portions of FIGS. 1–4 have been given corresponding reference numbers.

As best shown in FIG. 2, the device 41 includes a flat, rectangular plastic base 42 having an upper surface 43. Disposed over the base 42 and affixed centrally to the surface 43 is an upward protruding loop 44. The loop 44 extends from the surface 43 of the base 42 to define a central handle 46 for the device 41. Extending upwardly from each corner of the base 42 is a split frusto-conical projection 47. An opening 48 extends axially through the center of each conical projection 47 and through the underlying part of the base 42. The openings 48 in each of the projections 47 are located to respectively register with the terminals 28 on the board 11 at each wirepath intersection so that each terminal 28 forms a releasably tight fit with the associated opening 48. Each projection 47 has a slit 49 extending radially outwardly from its central opening 48 to the portion of its periphery flush with the corner of the base 42. The slit 49 extends along the entire length of each projection and continues through the adjacent corner of the base.

As best seen in FIG. 3, the central opening 48 has a cylindrical portion 51 extending inwardly from a first outer surface 51a of the projection 47. The cylindrical portion 51 tapers at its lower end as at 52 and extends through a lower second surface 52a of the projection 47 and the base 42. The cylindrical portion 51 of the opening 48 has a diameter slightly smaller than the largest cross-sectional dimension of the associated terminal 28, and the tapered portion 52 of the opening has a maximum diameter at the surface 52*a* slightly larger than such dimension.

In use, the device 41 is positioned so that the tapered portion 52 of each opening 47 rests over a respective terminal 28 to initially capture the terminal. Sufficient pressure is then exerted downwardly on the base 42 so that the slit 49 of each opening 48 opens slightly, thereby effectively enlarging the cylindrical portion 51 sufficiently to provide adequate clearance for the device to slide tightly over the terminals 28. When the device is pressed into position over the wires located at a wirepath intersection (e.g., wirepath intersection 21, FIG. 4), the pressure is released and the cylindrical portion 51 constricts into locking engagement about the terminal 28, since the diameter of the cylindrical portion of the opening 48 is smaller than the corresponding dimension of the terminal 28. With the device 41 in this position, the wires in wirepath intersection 21 are firmly secured to the board 11.

When it is desired to change the routing of any of the wires in the wirepath 21, or perform any other maintenance to the wirepath system, the device 41 is easily removable from the board 11 and intersection 21. To accomplish this, sufficient upward pressure is exerted on the device 41 (i.e., by pulling up on the handle 46 affixed to the base 42) so that the slit 49 of each projection 47 is again opened slightly. The cylindrical portion 51 of the opening 48 in the projection correspondingly expands sufficiently to provide enough clearance for the device 41 to be withdrawn over the terminals 28 and out of contact therewith.

After performing the necessary maintenance to the wirepath system, the device 41 may be reinserted in position in the same manner as it was originally inserted.

It is to be understood that the wires located in wirepath intersections 24, 26 and 27 (FIG. 4) can be also secured utilizing the device 41 as aforedescribed. Further, if desired, an extended wirepath may likewise be secured at any other point along its length (such as point 31 of wirepath 23) utilizing the device. It is also to be understood that although the terminals 28 are described as rectangular in cross section, the terminals may have any other convenient configuration. Further, the openings 48 in the device 41 need not be limited to circular shapes.

The device 41 can be made of any resilient insulative material, but preferably is made of a plastic such as "nylon." The device can be manufactured by molding in one piece, with the handle 46 and projections 47 formed integrally thereon.

Many other modifications in the device may be made by persons skilled in the art without departing from the scope of the present invention.

What is claimed is:

1. In a holddown device for securing loose strip material to an underlying support having a plurality of spaced projections extending upwardly therefrom to bound a portion of such material:

a resilient base having a lower surface and a plurality of openings individually extending upwardly through the base from the lower surface in alignment with said projections on said support, at least the upper portion of each of said openings having a cross sectional dimension smaller than the largest cross sectional dimension of the associated projection;

the base further having a corresponding plurality of slits individually extending transversely from the periphery of each opening to the periphery of the base;

the base including a flat portion having an upper surface parallel to the lower surface;

a plurality of individual elongated sections extending upwardly from the upper surface of the flat portion, each elongated section situated over a corresponding one of the openings in said base, each opening extending from the lower surface through the associated elongated section, the plurality of slits in the base individually extending upwardly through the elongated section and transversely from the associated opening in the elongated section to the associated periphery of the elongated section adjacent the periphery of the base, whereupon a downward pressure exerted on the base when the openings are aligned with the projection resiliently urges the lower surface into engagement with the bounded strip material.

2. The device of claim 1, wherein the base is made of nylon.

3. The device of claim 2, wherein the base is of rectangular shape, and each of the plurality of openings is situated adjacent a respective corner of said base.

4. The device of claim 3, wherein each of the plurality of openings has a circular cross-sectional configuration, and each of the plurality of slits extend outwardly from the periphery of said associated openings to the adjacent corner of the base.

5. The device of claim 4, wherein each of the plurality of openings has an upper portion whose cross-sectional dimension is slightly smaller than the cross-sectional dimensions of said projections, and a lower portion whose cross-sectional dimension is slightly larger than the cross-sectional dimensions of said projections.

6. The device of claim 6, which further includes a handle affixed to and extending from the upper surface of the flat portion to facilitate disengagement of the device from the strip material.

7. The device of claim 6 wherein each elongated section has a frusto-conical configuration.

* * * * *